(12) United States Patent
Gonzalez

(10) Patent No.: US 11,231,919 B2
(45) Date of Patent: Jan. 25, 2022

(54) LIVE UPDATES OF STATEFUL COMPONENTS

(71) Applicant: salesforce.com, inc., San Francisco, CA (US)

(72) Inventor: Mariano Luis Gonzalez, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/906,433

(22) Filed: Jun. 19, 2020

(65) Prior Publication Data

US 2021/0397429 A1    Dec. 23, 2021

(51) Int. Cl.
*G06F 9/445*    (2018.01)
*G06F 8/65*    (2018.01)
*G06F 8/71*    (2018.01)
*H04L 29/08*    (2006.01)
*G06F 8/61*    (2018.01)

(52) U.S. Cl.
CPC ............ *G06F 8/65* (2013.01); *G06F 8/61* (2013.01); *G06F 8/71* (2013.01); *H04L 67/34* (2013.01)

(58) Field of Classification Search
CPC ..... G06F 8/65; G06F 8/61; G06F 8/71; H04L 67/34

USPC .......................................... 717/168, 172–178
See application file for complete search history.

(56) References Cited

U.S. PATENT DOCUMENTS

2017/0180346 A1* 6/2017 Suarez ...................... G06F 8/71

* cited by examiner

*Primary Examiner* — Chuck O Kendall
(74) *Attorney, Agent, or Firm* — Holland & Hart LLP

(57) ABSTRACT

Methods, systems, and devices supporting live updates for stateful software components are described. A computing system may implement live updating for patching stateful software components. A device may execute a first set of requests at a first version of a software component deployed to a container, where the software component may be a stateful component associated with an in-memory state managed by the container. The device may receive a software patch that includes a second version of the software component from a user device, deploy the second version of the software component to the container, and route a second set of requests to the second version of the software component. The device may update the in-memory state of the software component based on the first version of the software component and the second version of the software component to maintain accurate state information across versions during the patching process.

20 Claims, 10 Drawing Sheets

LIVE UPDATES OF STATEFUL COMPONENTS

FIELD OF TECHNOLOGY

The present disclosure relates generally to database systems and data processing, and more specifically to live updates of stateful components.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms—or other systems—may support updating or patching various software components. When stateful software components are updated, a system may need to take precautions in order to maintain the state information. For example, the system may implement a temporary downtime to install the update without losing state information. However, such a downtime may negatively affect business processes, system performance, or the like. Alternatively, updating or patching stateful components without implementing a downtime may lead to a loss of state information, potentially resulting in inaccurate information, broken procedures, or some combination thereof, thereby degrading system performance.

DETAILED DESCRIPTION

Figure 1:
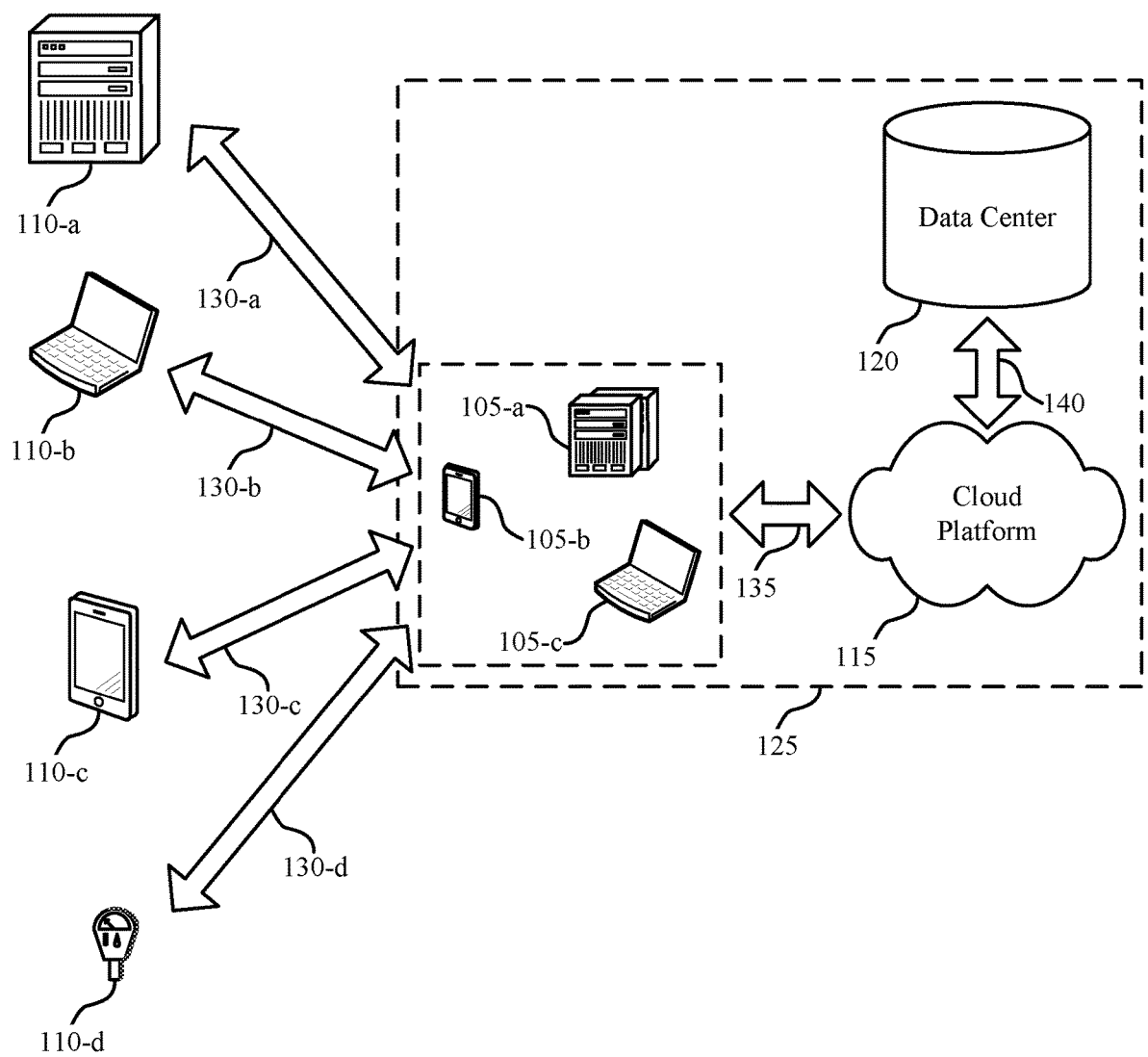
FIG. 1 illustrates an example of a system for managing software updates that supports live updates of stateful components in accordance with aspects of the present disclosure.

Some systems (e.g., cloud platforms or other systems) may support deploying a software update or patch to provide live updates for stateful software components. A software patch may be generated to mitigate a security vulnerability, fix a software bug, add application features, or the like. In some cases, the patch may be applied to a stateful software component. A stateful component may be an example of any software component including in-memory information that tracks a state of the component, where the state may change based on tasks performed by the component. In some systems, to update a stateful component, the system may enter a period of downtime to ensure that the state does not change during the updating, which may significantly decrease system efficiency and productivity (e.g., depending on the length of the system downtime). In some other systems, if the system does not enter a period of downtime to update the stateful component, the updating may cause the loss of state information, potentially resulting in data loss, processes breaking, or the like. For example, a first software component may contain a bug, so a second software component may be generated that contains a patch that mitigates the bug. In order to deploy the second software component, the first software component may be disabled, the second software component may be enabled, and all existing requests may be re-routed to the second software component, which may involve a period of downtime. In some additional or alternative examples, the second component may be enabled while the first component is also enabled, but this may result in the loss of state information as the first component may contain state information that the second component does not contain (e.g., because the first and second components may update their states separately during this joint active time).

A software updating system may implement live updates of stateful software components to reduce system downtime, maintain accurate state information, and increase system efficiency. A server (e.g., an application server) may host a software application that includes a number of software components. The software components may be deployed to containers, and the containers may control resources that are used by the components. The containers may be associated with state information, and the state information may be maintained in volatile storage (e.g., system memory, random access memory (RAM), etc.), non-volatile storage (e.g., read-only memory (ROM), flash memory, a hard drive, a solid state drive, etc.), or a combination thereof. In some cases, a container may manage state information that is associated with a software component and may support the live updating of the stateful software component. For example, a first component that is deployed to a container may contain a security vulnerability, so a second component that contains a software patch may be deployed to the container to eliminate the security vulnerability. The container may provide the second component with access to the state information that is generated by the first component. By implementing one or more protocols to manage state information between the first component and the second component while these components operate concurrently in the shared container, the system may support the live updating of stateful components (e.g., avoiding system downtime and maintaining accurate state information across the components).

In some cases, a component may be accessed via an application programming interface (API) (e.g., a representational state transfer (REST) API, a code class, a method definition, a function definition, etc.), and a mediator may manage tasks (e.g., ongoing requests, ongoing processes, etc.) that are associated with the component. A component consumer may transmit a request to the component API, and the mediator may route the request to the appropriate component and keep track of the status of the request (e.g., ongoing, complete, aborted, etc.). As part of a procedure for updating a first component, a mediator may deploy a second component to a container, provide access to state information associated with the first component, route new requests to the second component, and remove the first component when the requests associated with the first component are complete. The container may implement one or more protocols (e.g., APIs, algorithms, etc.) to facilitate in-memory state management between the first component and the second component until the first component is deleted. Providing state information that was created by a first component to a second component may improve patch deployment speed and cache hit rates, thereby increasing system efficiency.

Aspects of the disclosure are initially described in the context of an environment supporting an on-demand database service. Aspects of the disclosure are further described with respect to a software updating system, a software updating architecture, and a number of process flows. Aspects of the disclosure are further illustrated by and described with reference to apparatus diagrams, system diagrams, and flowcharts that relate to live updates of stateful components.

FIG. 1 illustrates an example of a system 100 for managing software updates that supports live updates of stateful components in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may include multiple databases, servers, or other types of systems. For example, the data center 120 or cloud platform 115 may include a server that supports patching operations, where the server may be an example of a single server, a server cluster, an application server, a database server, a cloud-based server, a virtual machine, or any other device or system supporting patching operations. In some cases, the server may support live updates of stateful components. The server of the subsystem 125 may receive a second version of a software component (e.g., an updated or patched version of a first version of the software component) and deploy the second version of the software component to a container. The state of the container may be updated based on the first version of the software component, and requests may be routed to the second version of the software component. In some examples, the server may receive the second version of the software component and/or the requests from a cloud client 105 or contact 110. Live updates of stateful components may support the rapid and seamless mitigation of software bugs and security vulnerabilities in stateful software components.

In some other systems, applying a patch to a stateful software component may result in increased system downtime, the loss of state information, a decreased system performance, or some combination thereof. For example, a first software component may contain a bug, so a second software component may be generated that contains a patch mitigating the bug. In order to deploy the second software component, the first software component may be disabled, and the second software component may be enabled, which may result in a period of downtime. In some additional or alternative examples, the second component may be enabled while the first component is also enabled, but this may result in the loss of state information as the first component may contain state information that the second component does not contain. In some cases, following the loss of state information, a user may submit information to generate the lost state information, which may result in increased processing time and degraded user experience.

In contrast, the system 100 may implement live updates of stateful software components, which may reduce system downtime, maintain state information, and increase system efficiency. For example, a server of subsystem 125 may host a software application that includes a number of software components. The software components may be deployed to containers, and the containers may control resources that are used by the components. A container may be associated with state information, and the container may manage state information that is associated with a software component. The state information associated with a component may be recreated for an updated component, and the container may support state information management and request routing between the first version of the component and the second, updated version of the component, thereby supporting the live updating of a stateful software component.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing devices may identify software bugs or security vulnerabilities associated with a device. For example, a user may identity a critical bug in a mission critical system or a zero day security vulnerability associated with the device. A system supporting live updates of stateful components may allow the seamless mitigation of the bug or vulnerability. In some cases, a user may identify a component that contains the bug or vulnerability, generate an updated version of the component that contains a patch for the bug or vulnerability, and replace the component with the updated version of the component without any system disruptions. Such an update may be transparent to users running the application that involves the component. The system supporting live updates may therefore improve the process of updating stateful software components.

Figure 2:
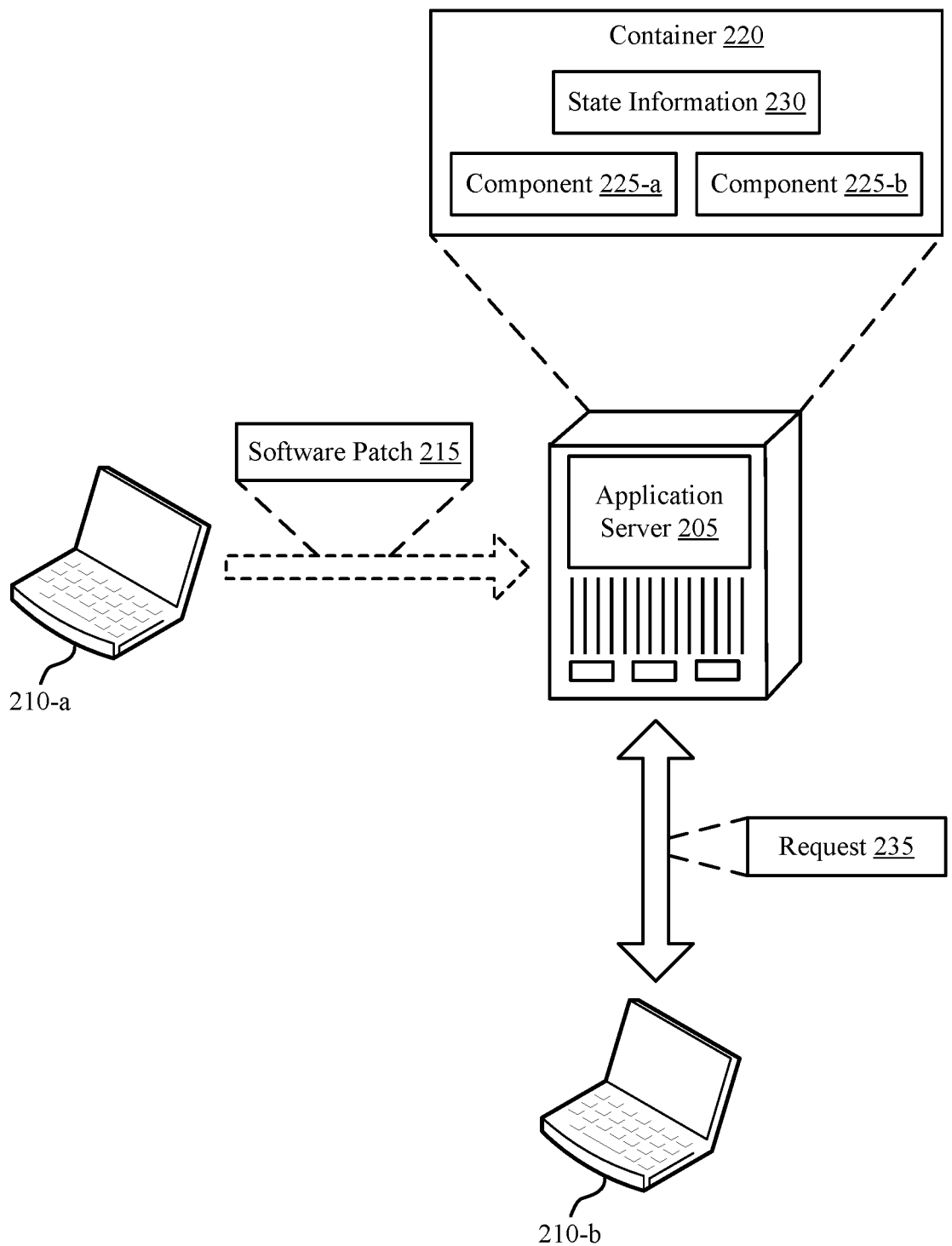
FIG. 2 illustrates an example of a software updating system that supports live updates of stateful components in accordance with aspects of the present disclosure.

FIG. 2 illustrates an example of a software updating system 200 that supports live updates of stateful components in accordance with aspects of the present disclosure. The software updating system 200 includes an application server 205 and a number of user devices 210. The system 200 may implement aspects of a system 100 as described with reference to FIG. 1. For example, an application server 205 may be an example or component of a data center 120 or cloud platform 115, and the user devices 210 may be examples of cloud clients 105 or contacts 110.

The application server 205 may represent aspects of a communication server, a data processing server, a database server, a cloud-based server, a server cluster, a virtual machine, or some similar data processing device or system. The application server 205 may communicate with other devices such as the user devices 210. In some cases, the application server 205 may support one or more software components 225 that handle requests, perform processing, or provide any other functionality to the software updating system 200. If a component 225 is stateless, the component 225 may not be associated with an in-memory state (e.g., state information 230). As such, if a software patch 215 is determined for a stateless component, the software updating system 200 may simply stop the stateless component, patch the stateless component while it is deactivated, and restart the stateless component with the installed patch. Because a stateless component does not rely on accurate state information 230 in memory, restarting the component may not affect the performance of the stateless component.

In contrast, if a component 225 is stateful, the component 225 may be associated with an in-memory state (e.g., state information 230 maintained in memory to support proper operation of the component 225). Restarting such a stateful component 225 may cause the content in memory (e.g., the state information 230) to be lost. Losing the state information 230 may break one or more processes performed by the component 225, resulting in performance degradation, corrupted data or procedures, or a combination thereof. As such, to efficiently patch a stateful component 225, the software updating system 200 may implement one or more techniques to keep the component 225 live throughout the patching process.

For example, the application server 205 may receive a software patch 215 or an indication of the software patch 215 from user device 210-a. The software patch 215 may mitigate a security vulnerability, fix a software bug, add application features, update functionality, or any combination thereof for a software component. The software patch 215 may be deployed to update various systems such as software programs, application servers, sets of microservices, service meshes, or the like. In some cases, applying the software patch 215 to stateful systems (e.g., standalone software programs, application servers, etc.) may support persisting state information 230 throughout the update, which may reduce system downtime and improve user experience.

The application server 205 be associated with a container 220, and the container 220 may be associated with a number of components 225 as well as the state information 230 for one or more components 225. A component 225 may, for example, be a stateful software component such as an API gate, a cache (e.g., a web cache, an application cache, etc.), or any other software component that maintains and uses information in memory. As an example, an API gate may receive requests 235 (e.g., API requests) from other services, may validate the requests 235, and may route the requests 235 to a proper system or component 225 based on one or more patterns or procedures. To provide this functionality, the API gate may rely on stateful information tracking how data is routed, historical traffic patterns, routing policies, or the like. Losing such information (e.g., based on a system restart) may result in incorrect or inefficient routing of requests 235, negatively affecting system performance.

To avoid a system restart, the application server 205 may deploy the patch while the system is live. For example, a first set of tasks may be performed at a first version of a software component (e.g., component 225-a), and the application server 205 may concurrently deploy a second version of the software component (e.g., component 225-b) to the container 220 based on receiving the software patch 215. That is, the software patch 215 may define component 225-b or code that generates component 225-b based on component 225-a and the software patch 215. The container 220 may possess access privileges of component 225-a and component 225-b, which may support the live updating of the first component 225-a with the second component 225-b (e.g., a first version and a second version of a same component 225).

The application server 205 and/or the container 220 may be associated with a mediator. The mediator may be implemented in hardware, software executed by a processor, firmware, or any combination thereof. The mediator may intercept and proxy requests that are sent to the container 220 or a system with which the container 220 is associated. For example, the mediator may route a first set of requests to the first version of the software component (e.g., component 225-a) and route a second set of requests to the second version of the software component (e.g., component 225-b). In some cases, the second set of requests may be associated with requests received subsequent to the deployment of the second version of the software component 225-b in the container 220. In some implementations, the mediator may be configured to create new components 225, delete components 225, or both in addition to routing traffic between components 225 and/or different versions of components 225.

The state of the second component 225-b may be updated based on the state of the first component 225-a. In some cases, the second component 225-b may access state information 230 that is associated with the first component 225-a, while in some additional or alternative cases, the second component 225-b may be deployed to a second container 220, and the state information 230 associated with the first component 225-a may be duplicated for the second component 225-b to access (e.g., in the second container 220). The mediator may manage access to resources (e.g., the state information 230 and/or other resources) that are associated with the container 220. In some cases, the mediator may support the second version of the software component 225-b accessing the state information 230 that was generated, received, sent, stored, modified, or identified for the first version of the software component 225-a. In some additional or alternative cases, the mediator may support the accessing and/or management of state information 230 across multiple containers 220.

User device 210-b may transmit a number of requests 235 to the application server 205, and the mediator may route the requests 235 to a component 225. In some cases, user device 210-b may communicate with a system of the application server 205, and the system may contain a number of components 225. User device 210-a may transmit the software patch 215 to the application server 205, and the application server 205 may patch a first version of a component 225-a with a second version of the component 225-b based on the patch 215. The component may be patched in real-time or pseudo real-time, which may improve the performance of user device 210-b.

During patching, the application server 205 (e.g., using the mediator) may route the requests 235 to a current version of a component 225. For example, upon installation of the second version of the component 225-b, the mediator may start routing requests 235 for that component to the second version (e.g., the latest version). However, the first version of the component 225-a may still have tasks queued for execution (e.g., based on previous requests 235 routed to the first version of the component 225-a). As such, the application server 205 may wait for the first version of the component 225-a to complete all pending tasks before deleting the first version, for example, based on installing the second (updated) version of the component 225-b. However, to avoid inefficient system downtime, the second version of the component 225-b may process requests while the system waits for the first version of the component 225-a to finish processing the requests in the first version's request queue.

Such a procedure may allow for the first version of the component 225-a and the second version of the component 225-b to operate concurrently for a period of time (e.g., after installation of the second version but before the first version has completed processing of all pending requests 235). To handle such a scenario, the application server 205 may implement one or more protocols (e.g., APIs) between components 225, containers 220, or both to keep the state information 230 consistent between the versions of the component 225. If both the first version of the component 225-a and the second version of the component 225-b are deployed in a same container 220, the container 220 may manage resources (e.g., including state information 230) for both versions. In this way, the container 220 may stagger—or otherwise decouple—resource requests and state updates such that the state information 230 accurately captures processes performed at each version of the component 225. For example, because the container 220—and not a component 225—owns the resources, and because the components 225 may access the resources via a mediator, protocol, or API, the system may utilize the mediator, protocol, or API to manage memory resources across separate requests handled at separate components 225 (or separate versions of a component 225). As such, both component 225-a and component 225-b may use the same resources (e.g., memory resources), allowing the components 225 to stay in sync (e.g., using one or more protocols for resource management).

In some cases, the software updating system 200 may implement a number of protocols. Each protocol may be universal, user-specific, tenant-specific, system-specific, application-specific, technology-specific, or some combination thereof. For example, the software updating system 200 may use a different protocol for a standalone application and for a distributed system. Additionally or alternatively, the software updating system 200 may use a particular protocol based on an underlying architecture, programming language (e.g., Java, C++, etc.), or both. By determining the proper protocol, the applications server 205 may determine how to update state information 230 based on multiple components 225 running concurrently. The protocol may define how to process requests at component 225-a and different requests at component 225-b without causing processing errors at component 225-a or component 225-b due to the state information 230.

By implementing the techniques described herein, the application server 205 may patch a system (e.g., a system running an application that uses a first version of a component 225-a) without stopping the application and without losing state information 230. For example, if a user is on a video call using user device 210-b, and the application supporting the video call relies on a component 225, the software updating system 200 may replace the first version of the component 225-a with a second version of the component 225-b without stopping the video call (i.e., transparent to the user). As such, recording information for the video call and the video call connection may be maintained throughout the patching process. Such a procedure supports replacing (or otherwise fixing) a portion of a large, complex, standalone application without having to stop or restart the application. This supports patching systems on-the-fly, transparent to users interacting with the systems, without losing any information critical to the systems, and without scheduling downtime for the patching.

In another example, a user may build an application that utilizes a set of connectors (e.g., components 225) between systems. Each connector may be specific to one or more particular systems. For example, for a specific database system "DB1," the application may use a DB1 connector contained in a DB1 container. The user (or an administrative user on the backend) may deploy a new version of a DB1 connector component into the DB1 container without disrupting the dataflow into or out of the DB1 database system.

Figure 3:
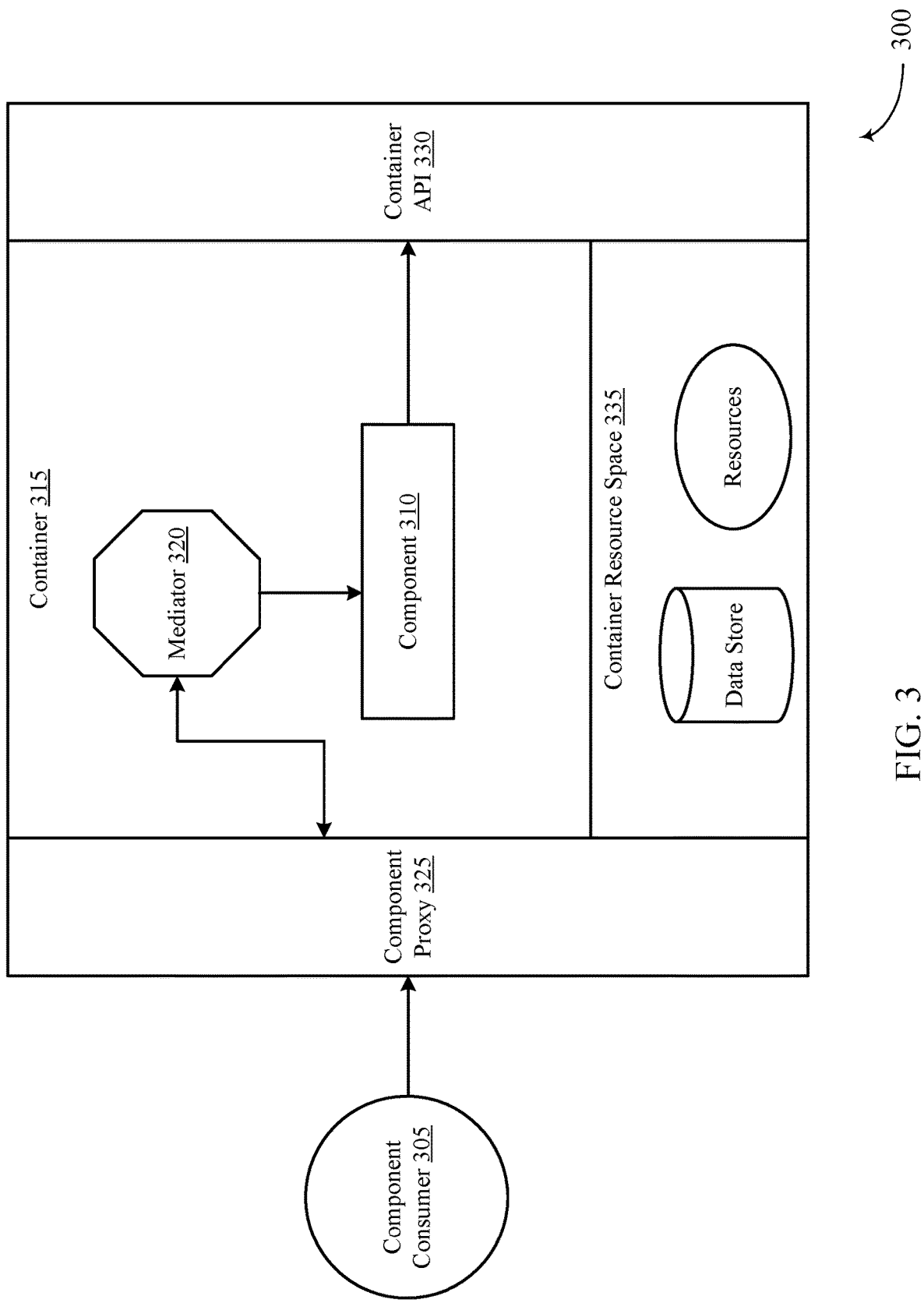
FIG. 3 illustrates an example of a software updating architecture that supports live updates of stateful components in accordance with aspects of the present disclosure.

FIG. 3 illustrates an example of a software updating architecture 300 that supports live updates of stateful components in accordance with aspects of the present disclosure. The software updating architecture 300 may include a component consumer 305 which may be an example or component of a cloud client 105 or a contact 110, as described with reference to FIG. 1. The software updating architecture 300 may further include a component 310, a container 315, a mediator 320, a component proxy 325, a container API 330, a container resource space 335, or a combination thereof, which may be examples or components of a data center 120 or cloud platform 115, as described with reference to FIG. 1.

The component consumer 305 may be an example of a user device 210 as described with reference to FIG. 2 or a component 310. For example, a user operating a user device may interact with (e.g., transmit requests to, communicate with, etc.) a component 310, while in some additional or alternative examples, a component 310 may communicate with one or more additional components 310. In some cases, the component 310 may be an example of a piece of code or a software subsystem to be patched. Each component 310 may contain an API (e.g., a REST API, a code class, a method definition, a function definition, etc.) through which the component 310 and/or the functionality of the component 310 may be invoked.

The container 315 may contain or be associated with the computing space in which a component 310 resides. The container 315 may be an example of a Java class loader, a Docker container, a process, a thread, or the like. In some cases, a container 315 may be associated with one component 310, while in some additional or alternative cases, a container 315 may be associated with multiple components 310 (or multiple versions of a component 310). Containers 315 may allow different components 310 in the same system to be separated and function in their own space. The container 315 may be the owner of the resources held by a component 310 (e.g., in a container resource space 335), and the container 315 may support the preservation of state information throughout component updating procedures. Such resources may include memory resources, processing resources, state information, or any other information or resources associated with running a component 310.

The component proxy 325 may be an example of a piece of software or a component 310, and the component proxy 325 may intercept and proxy requests that are transmitted to the components 310. The mediator 320 may act as an intermediate between the requests and responses made to each component 310, and the mediator 320 may have visibility (e.g., access privileges) to each container 315. In some cases, the component proxy 325 may transmit the requests to the mediator 320, while in some additional or alternative examples, the mediator 320 may receive the requests from a component consumer 305. For example, the component proxy 325 and the mediator 320 may manage external requests and responses associated with the component consumer 305 when the component consumer 305 consumes functionality of the component 310. The mediator 320 may send proxied requests to the component 310 for processing. In this way, the mediator 320 may trigger a specific component 310 or version of a component 310 based on the requests received at the mediator 320.

The container API 330 may support providing up to date state information to multiple components 310. In some cases, the container API may perform a protocol that obtains a dump of the resources (e.g., the state information) associated with a first component 310 deployed to a first container 315 and replicate or provide the state information to a second component 310. In some cases, the state information may be replicated in a second container 315 where the second component 310 is deployed, while in some other cases the second component 310 may be provided access to the state information held by the first component 310 (e.g., in the same container 315). For example, the component 310 may be granted resource space access via the container API 330. Such resource space access may include resources managed by the container 315 (e.g., the container resource space 335), resources managed by another container 315 supporting another version of the same component 310, or a combination thereof. In some cases, the container API 330 may utilize a set of protocols (e.g., state protocols) to manage state information for multiple versions of a component 310 within a container 315 or across containers 315. For example, a protocol may facilitate transfer of in-memory state between containers 315 and may support state tracking across one or more versions of a component 310.

Figure 4:
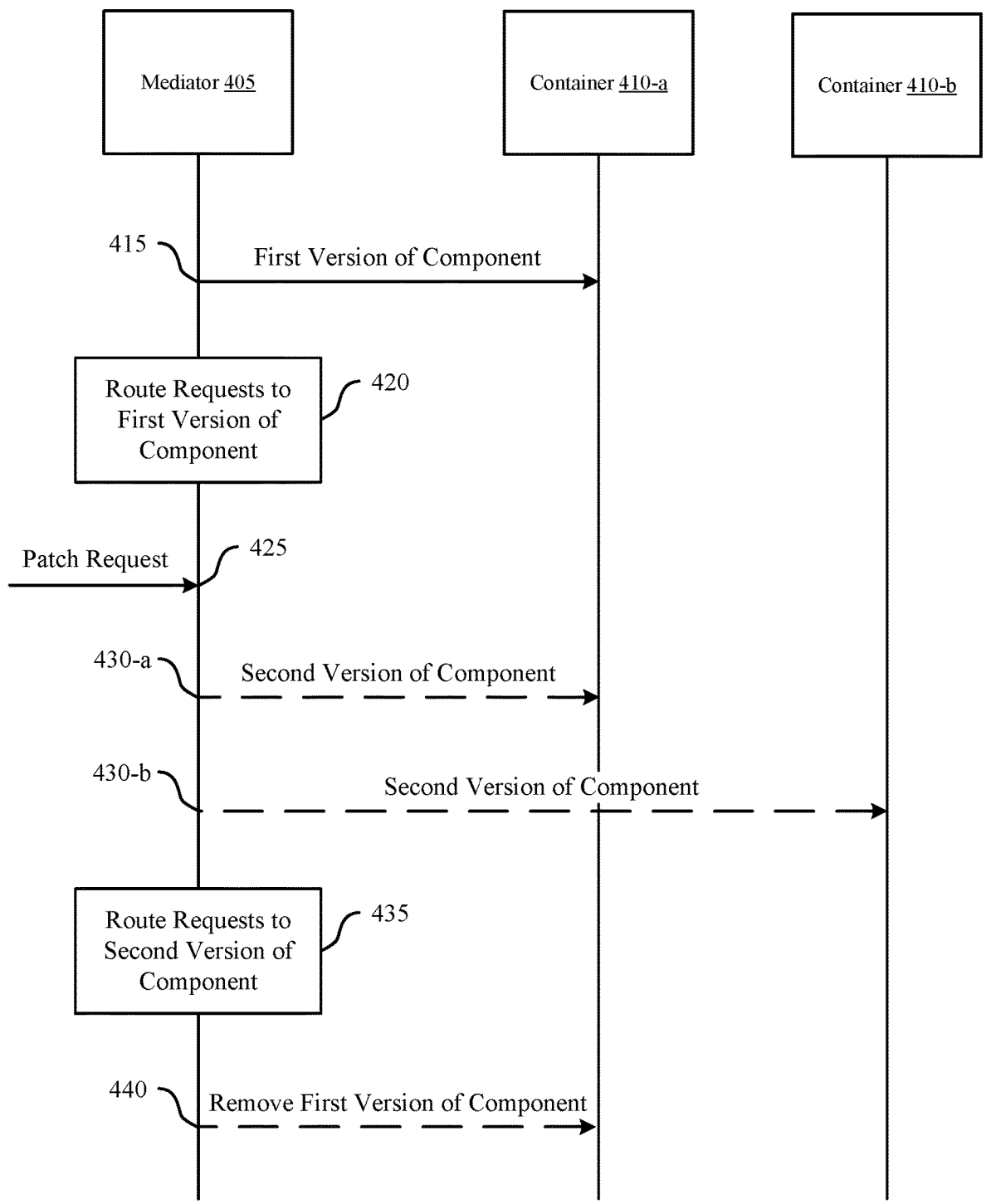
FIGS. 4 and 5 illustrate examples of process flows that support live updates of stateful components in accordance with aspects of the present disclosure.

FIG. 4 illustrates an example of a process flow 400 that supports live updates of stateful components in accordance with aspects of the present disclosure. The process flow 400 includes a mediator 405 and a number of a containers 410. These may be examples of the corresponding devices as described with reference to FIGS. 1 through 3. Alternative examples of the following may be implemented, where some steps are performed in a different order than described or are not performed at all. In some cases, steps may include additional features not mentioned below, or further steps may be added.

At 415, a first version of a component may be deployed to container 410-a. The first version of the component may correspond to a software component, and the first version of the component may contain a security vulnerability, a bug, or a number of missing features. At 420, the mediator 405 may route requests to the first version of the component. The mediator 405 may keep track of the ongoing requests to an API associated with the software component. Each time a request is made a counter may be increased, and each time an operation (e.g., an operation based on the request) emits a response (e.g., a response code, a result message, etc.), the counter may be decreased. Maintaining a counter in this fashion may allow the mediator 405 to keep track of the number of operations associated with a software component and the status of the operations. At 425, the mediator 405 may receive a patch request. The patch request may contain or indicate a second version of the software component.

The mediator 405 may deploy a second version of the component (e.g., a new instance of the software component) to a container 410. In some cases, the second version of the component may be deployed to the same container that contains the first version of the component. For example, at 430-*a*, the mediator 405 may deploy the second version of the component to the container 410-*a*. In some additional or alternative cases, the second version of the component may be deployed to a new or different container (e.g., a container that does not include the first version of the component). For example, at 430-*b*, the mediator 405 may deploy the second version of the component to the container 410-*b*.

The mediator 405 may retrieve (e.g., via a dump protocol) the resources held by the first version of the component. The mediator may transfer, generate, or restore the resources to the second version of the component. When the first version of the component and the second version of the component are in the same container 410, the mediator may provide the second version of the component access to the resources held by the container 410-*a* for the first version of the component. When the first version of the component is in a first container 410-*a* and the second version of the component is in a second container 410-*b*, the mediator 405 may recreate the resources associated with the first container 410-*a* in the second container 410-*b*, thereby providing the second version of the component access to the resources associated with the first version of the component. Additionally, the mediator 405, the containers 410, or both may implement one or more protocols (e.g., using one or more APIs) to keep the state information for the first version of the component and the state information for the second version of the component in sync. For example, while both versions of the component are active, the state information for the component may be updated based on operations performed at each version of the component, accurately maintaining state information for the stateful software component.

At 435, the mediator 405 may route requests to the second version of the component. The mediator 405 may monitor the operations associated with the first version of the component and identify when the operations are complete. At 440, if all pending requests at the first version of the component are complete, the mediator 405 may remove or dispose the first version of the component. In some cases, the first container (e.g., container 410-*a*) may additionally be disposed. The first version of the component and/or the first container may be disposed based on identifying that the operations associated with the first version of the component are complete. In some cases, the patching operation may end based on routing requests to the second version of the component, removing the first version of the component, removing the first container 410-*a*, or a combination thereof.

Figure 5:
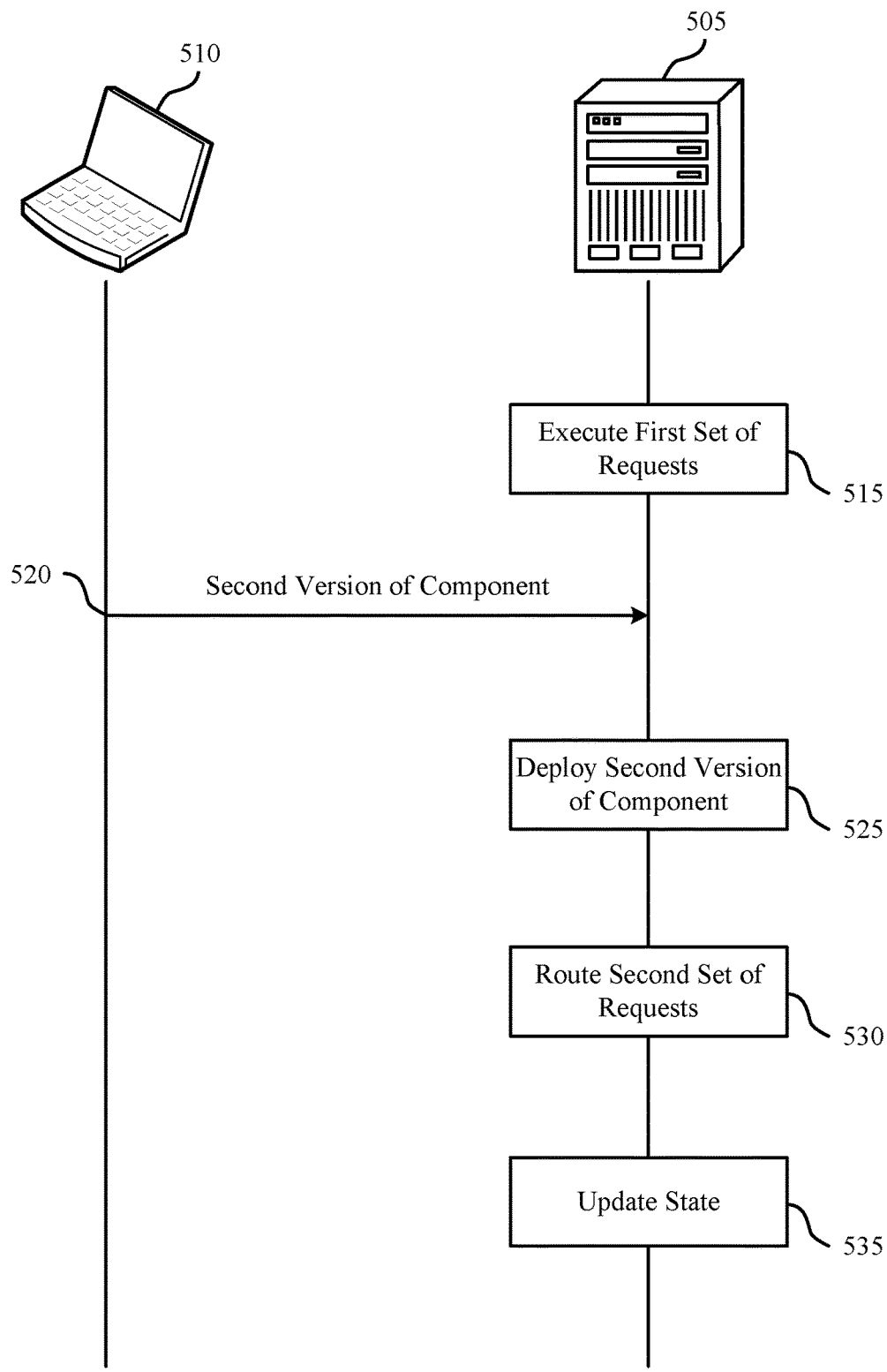

FIG. 5 illustrates an example of a process flow 500 that supports live updates of stateful components in accordance with aspects of the present disclosure. The process flow 500 may include an application server 505 and a user device 510. These may be examples of the corresponding devices as described with reference to FIGS. 1 through 3. The application server 505 may implement live updates to patch stateful components associated with a user device 510, an application server 505, or a similar computing device. Live updates may improve user experience and prevent security vulnerabilities. Alternative examples of the following may be implemented, where some steps are performed in a different order than described or are not performed at all. In some cases, steps may include additional features not mentioned below, or further steps may be added.

At 515, a first set of requests may be executed at a first version of a software component deployed to a container. The software component may be a stateful component that is associated with state information managed by the container. In some cases, the state information may be stored in memory (e.g., volatile memory), while in some additional or alternative cases, the state information may include non-volatile memory, resource connections, resource ownership (e.g., the owner of a file descriptor, the owner of a socket, the owner of a database pool, etc.), or any combination thereof.

At 520, the application server 505 may receive a software patch from a user device. The software patch may include a second version of the software component or an indication of a second version of the software component. For example, the application server 505 may receive an indication of the second version of the software component and build the second version of the software component based on the indication. The second version of the software component may include patched security vulnerabilities, bug fixes, additional features, or the like.

At 525, the application server 505 may deploy the second version of the software component to the container, and the second version of the software component may be deployed based on the software patch. At 530, a second set of requests may be routed to the second version of the software component based on the deploying.

At 535, the state information associated with the software component may be updated based on the first version of the software component and the second version of the software component. In some cases, execution of the first set of requests may be completed at the first version of the software component, and the first version of the software component may be deleted from the container based on completing execution of the first set of requests. At such a time, the system may switch over to solely using the second version of the component for requests to the software component.

Figure 6:
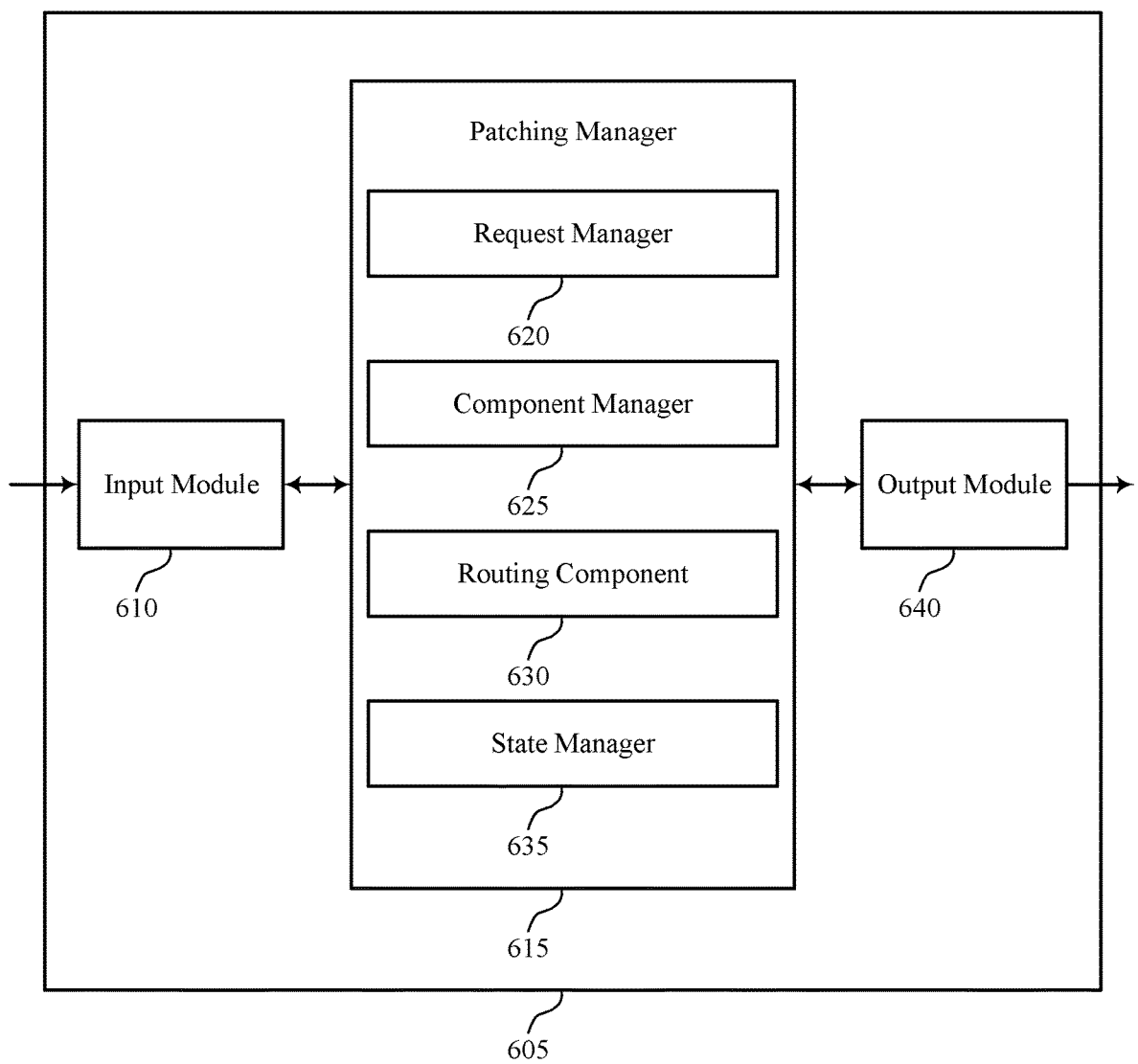
FIG. 6 shows a block diagram of an apparatus that supports live updates of stateful components in accordance with aspects of the present disclosure.

FIG. 6 shows a block diagram 600 of an apparatus 605 that supports live updates of stateful components in accordance with aspects of the present disclosure. The apparatus 605 may include an input module 610, a patching manager 615, and an output module 640. The apparatus 605 may also include a processor. Each of these components may be in communication with one another (e.g., via one or more buses). In some cases, the apparatus 605 may be an example of a user device, a server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the patching manager 615 to support live updates of stateful components. In some cases, the input module 610 may be a component of an input/output (I/O) controller 815 as described with reference to FIG. 8.

The patching manager 615 may include a request manager 620, a component manager 625, a routing component 630, and a state manager 635. The patching manager 615 may be an example of aspects of the patching manager 705 or 810 described with reference to FIGS. 7 and 8.

The patching manager 615 and/or at least some of its various sub-components may be implemented in hardware, software executed by a processor, firmware, or any combination thereof. If implemented in software executed by a processor, the functions of the patching manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The patching manager 615 and/or at least some of its various sub-components may be physically located at various positions, including being distributed such that portions of functions are implemented at different physical locations by one or more physical devices. In some examples, the patching manager 615 and/or at least some of its various sub-components may be a separate and distinct component in accordance with various aspects of the present disclosure. In other examples, the patching manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The request manager 620 may execute a first set of requests at a first version of a software component deployed to a container, where the software component is an example of a stateful component associated with an in-memory state of the software component managed by the container.

The component manager 625 may receive, from a user device, a software patch including a second version of the software component and may deploy the second version of the software component to the container based on the software patch. The routing component 630 may route a second set of requests to the second version of the software component based on the deploying. The state manager 635 may update, at the container, the in-memory state of the software component based on the first version of the software component and the second version of the software component.

The output module 640 may manage output signals for the apparatus 605. For example, the output module 640 may receive signals from other components of the apparatus 605, such as the patching manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
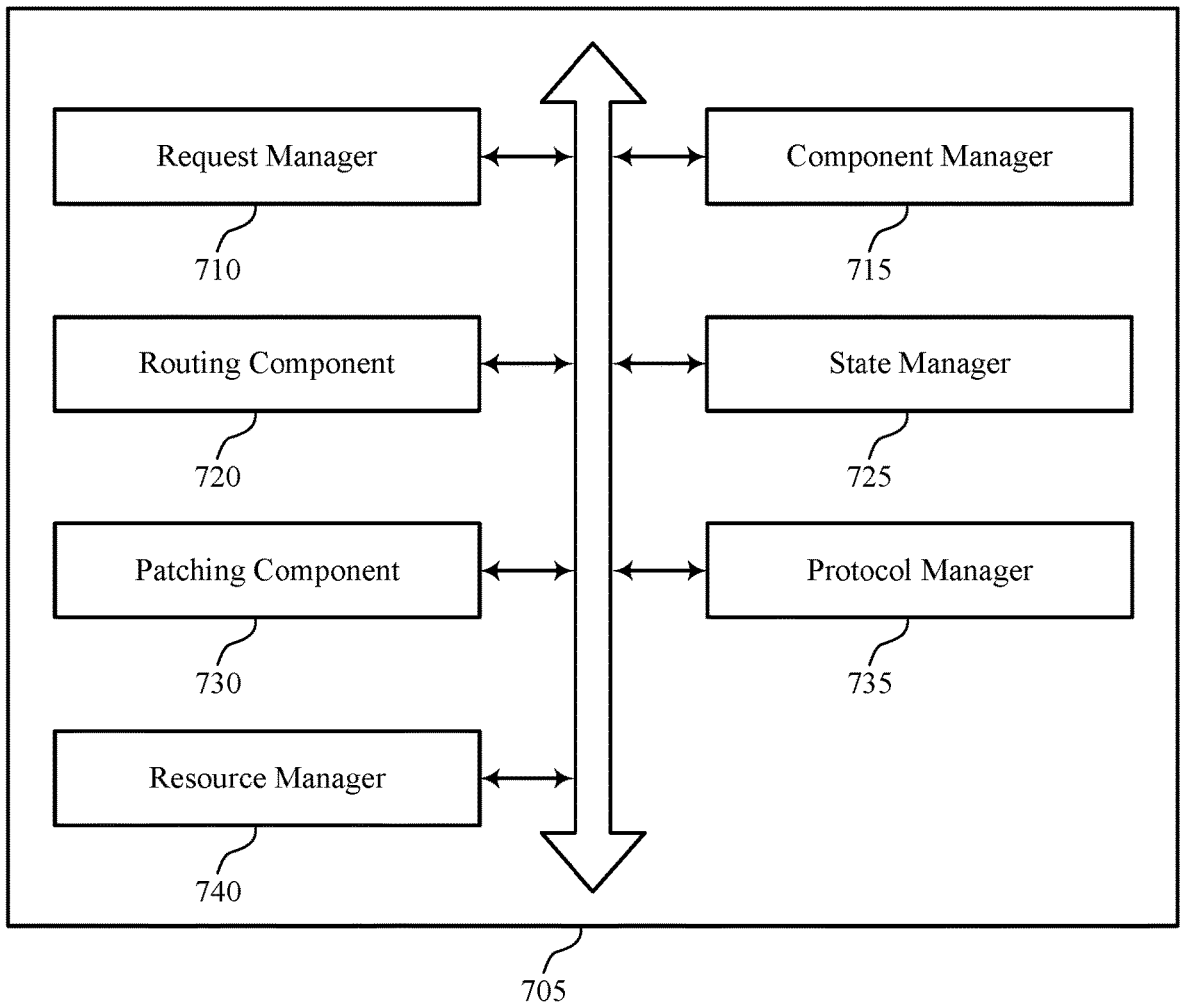
FIG. 7 shows a block diagram of a patching manager that supports live updates of stateful components in accordance with aspects of the present disclosure.

FIG. 7 shows a block diagram 700 of a patching manager 705 that supports live updates of stateful components in accordance with aspects of the present disclosure. The patching manager 705 may be an example of aspects of a patching manager 615 or a patching manager 810 described herein. The patching manager 705 may include a request manager 710, a component manager 715, a routing component 720, a state manager 725, a patching component 730, a protocol manager 735, a resource manager 740, or any combination of these or other components or managers. Each of these modules may communicate, directly or indirectly, with one another (e.g., via one or more buses).

The request manager 710 may execute a first set of requests at a first version of a software component deployed to a container, where the software component includes a stateful component associated with an in-memory state of the software component managed by the container.

The component manager 715 may receive, from a user device, a software patch including a second version of the software component. In some examples, the component manager 715 may deploy the second version of the software component to the container based on the software patch. The routing component 720 may route a second set of requests to the second version of the software component based on the deploying. The state manager 725 may update, at the container, the in-memory state of the software component based on the first version of the software component and the second version of the software component.

In some examples, the request manager 710 may complete execution of the first set of requests at the first version of the software component. In some such examples, the component manager 715 may delete the first version of the software component from the container based on completing the execution of the first set of requests.

In some examples, the request manager 710 may execute the second set of requests at the second version of the software component based on the routing. In some cases, the software component may be associated with a software application. In some such cases, the request manager 710 may run the software application, where executing the first set of requests at the first version of the software component and executing the second set of requests at the second version of the software component are based on running the software application. In some cases, at least a portion of the first set of requests is executed at the first version of the software component concurrent to at least a portion of the second set of requests being executed at the second version of the software component.

In some examples, the patching component 730 may perform a patching operation based on receiving the software patch, where the patching operation includes deploying the second version of the software component to the container and deleting the first version of the software component from the container. In some such examples, the patching component 730 may maintain a connection for running the software application, a data flow for running the software application, or both throughout the patching operation. In some cases, the patching component 730 may communicate with a set of user devices operated by a set of users based on running the software application, where the patching operation is performed transparent to the set of users.

In some examples, deploying the second version of the software component may involve the state manager 725 replicating the in-memory state of the software component from the first version of the software component to the second version of the software component.

In some examples, updating the in-memory state of the software component may involve the protocol manager 735 implementing a protocol to manage the in-memory state of the software component. In some examples, updating the in-memory state of the software component may involve the protocol manager 735 receiving, at the container, first execution information for the first version of the software component and second execution information for the second version of the software component. In some such examples, the protocol manager 735 may aggregate the first execution information and the second execution information according to the protocol and may update the in-memory state of the software component based on the aggregating.

In some examples, the resource manager 740 may manage, at the container, a set of resources for the software component, the set of resources including the in-memory state of the software component. In some cases, the first version of the software component and the second version of the software component access the set of resources from the container to execute the first set of requests and the second set of requests.

In some examples, the routing component 720 may intercept, at a mediator associated with a set of software components, a request indicating the software component and may route the request to the container including the software component based on the request indicating the software component. In some examples, the routing component 720 may maintain, at the mediator, a set of connections with the set of software components via a set of APIs. In some cases, the second set of requests may be routed to the second version of the software component via an API.

Figure 8:
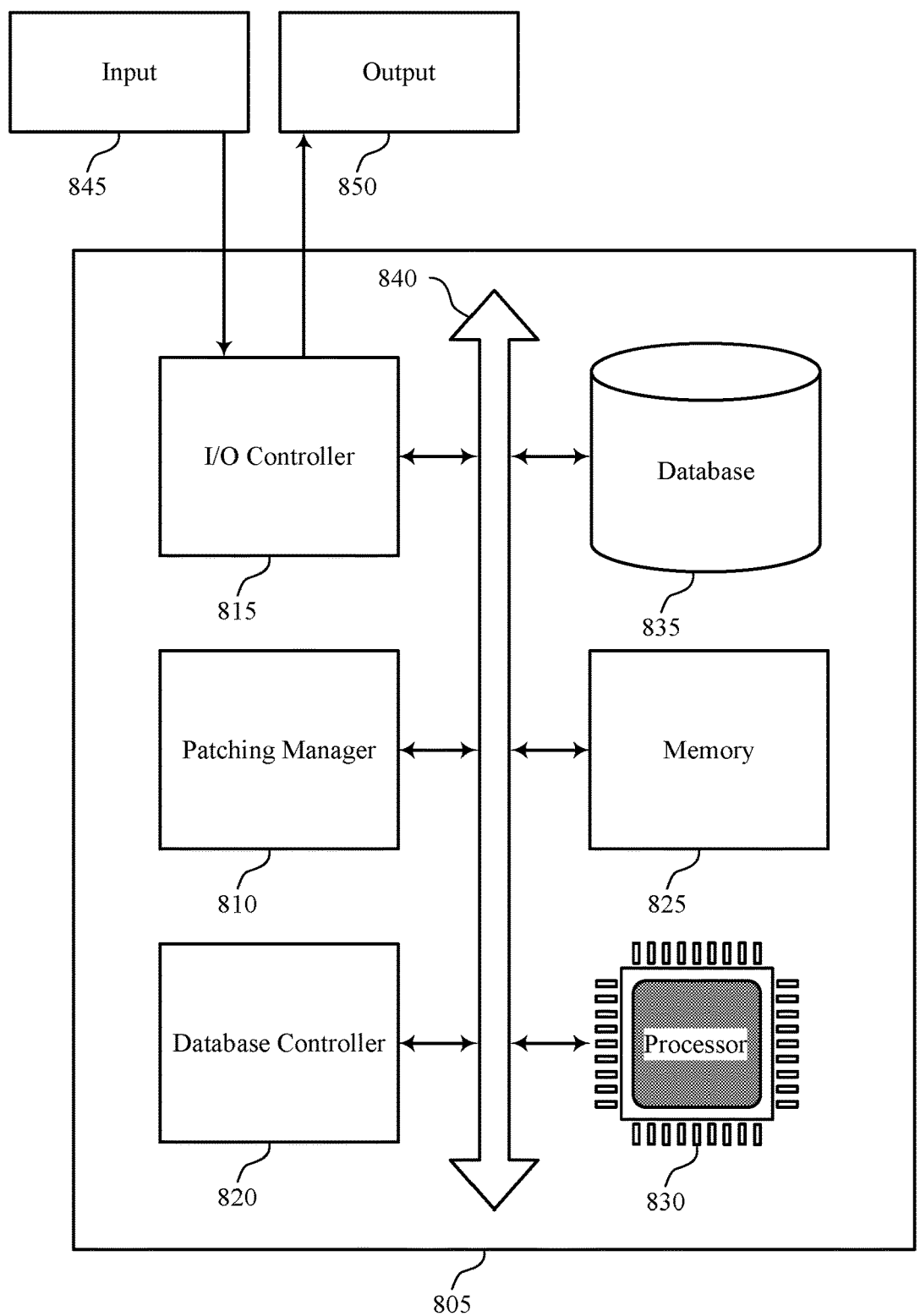
FIG. 8 shows a diagram of a system including a device that supports live updates of stateful components in accordance with aspects of the present disclosure.

FIG. 8 shows a diagram of a system 800 including a device 805 that supports live updates of stateful components in accordance with aspects of the present disclosure. The device 805 may be an example of or include the components of a server (e.g., a single server, a server cluster, an application server, a database server, a cloud-based server, a virtual machine, or any other device or system supporting data processing) or an apparatus 605 as described herein. The device 805 may include components for bi-directional data communications including components for transmitting and receiving communications, including a patching manager 810, an I/O controller 815, a database controller 820, memory 825, a processor 830, and a database 835. These components may be in electronic communication via one or more buses (e.g., bus 840).

The patching manager 810 may be an example of a patching manager 615 or 705 as described herein. For example, the patching manager 810 may perform any of the methods or processes described above with reference to FIGS. 6 and 7. In some cases, the patching manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In some other cases, the database controller 820 may operate automatically without user interaction. The database 835 may be an example of a single database, a distributed database, multiple distributed databases, a data store, a data lake, or an emergency backup database.

Memory 825 may include RAM and ROM. The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting live updates of stateful components).

Figure 9:
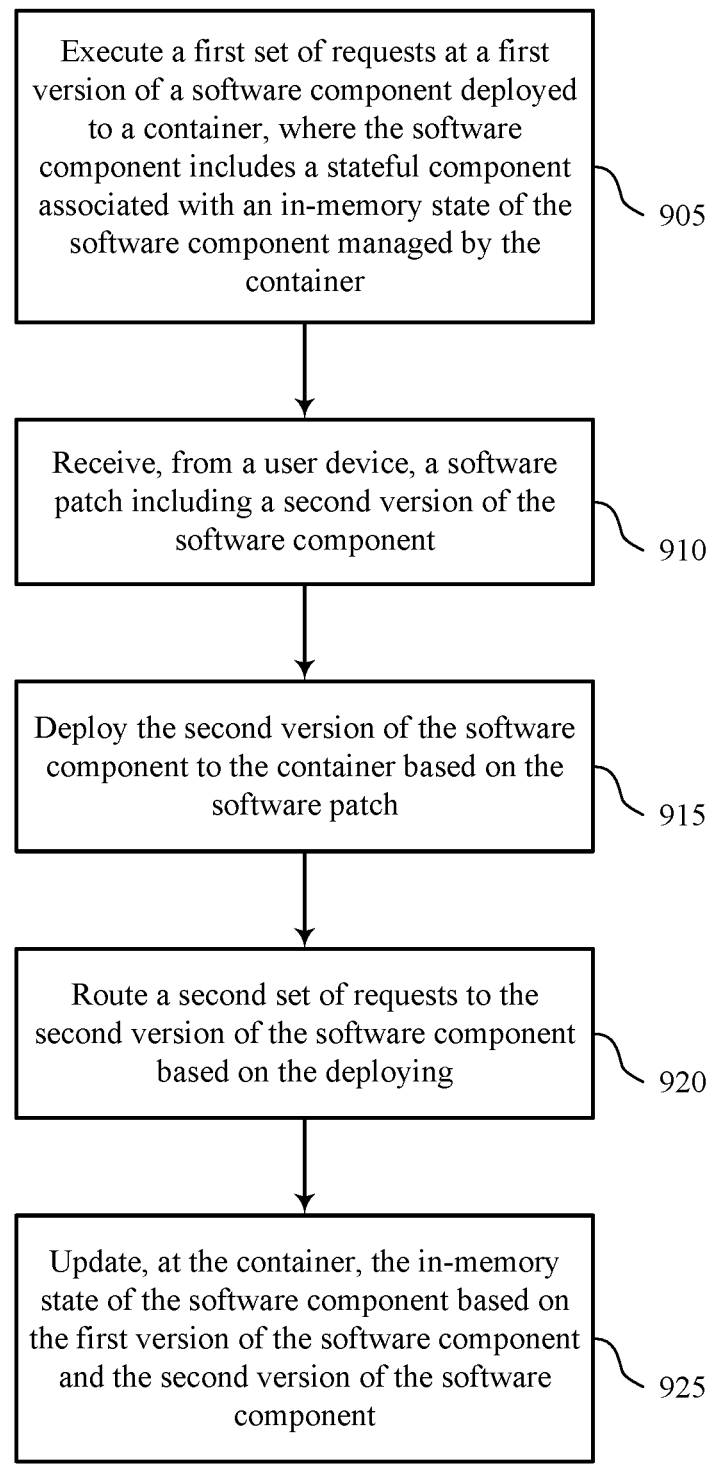
FIGS. 9 and 10 show flowcharts illustrating methods that support live updates of stateful components in accordance with aspects of the present disclosure.

FIG. 9 shows a flowchart illustrating a method 900 that supports live updates of stateful components in accordance with aspects of the present disclosure. The operations of method 900 may be implemented by a server (e.g., a single server, a server cluster, an application server, a database server, a cloud-based server, a virtual machine, or any other device or system supporting data processing) or its components as described herein. For example, the operations of method 900 may be performed by a patching manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 905, the server may execute a first set of requests at a first version of a software component deployed to a container, where the software component includes a stateful component associated with an in-memory state of the software component managed by the container. The operations of 905 may be performed according to the methods described herein. In some examples, aspects of the operations of 905 may be performed by a request manager as described with reference to FIGS. 6 through 8.

At 910, the server may receive, from a user device, a software patch including a second version of the software component. The operations of 910 may be performed according to the methods described herein. In some examples, aspects of the operations of 910 may be performed by a component manager as described with reference to FIGS. 6 through 8.

At 915, the server may deploy the second version of the software component to the container based on the software patch. The operations of 915 may be performed according to the methods described herein. In some examples, aspects of the operations of 915 may be performed by a component manager as described with reference to FIGS. 6 through 8.

At 920, the server may route a second set of requests to the second version of the software component based on the deploying. The operations of 920 may be performed according to the methods described herein. In some examples, aspects of the operations of 920 may be performed by a routing component as described with reference to FIGS. 6 through 8.

At 925, the server may update, at the container, the in-memory state of the software component based on the first version of the software component and the second version of the software component. The operations of 925 may be performed according to the methods described herein. In some examples, aspects of the operations of 925 may be performed by a state manager as described with reference to FIGS. 6 through 8.

Figure 10:
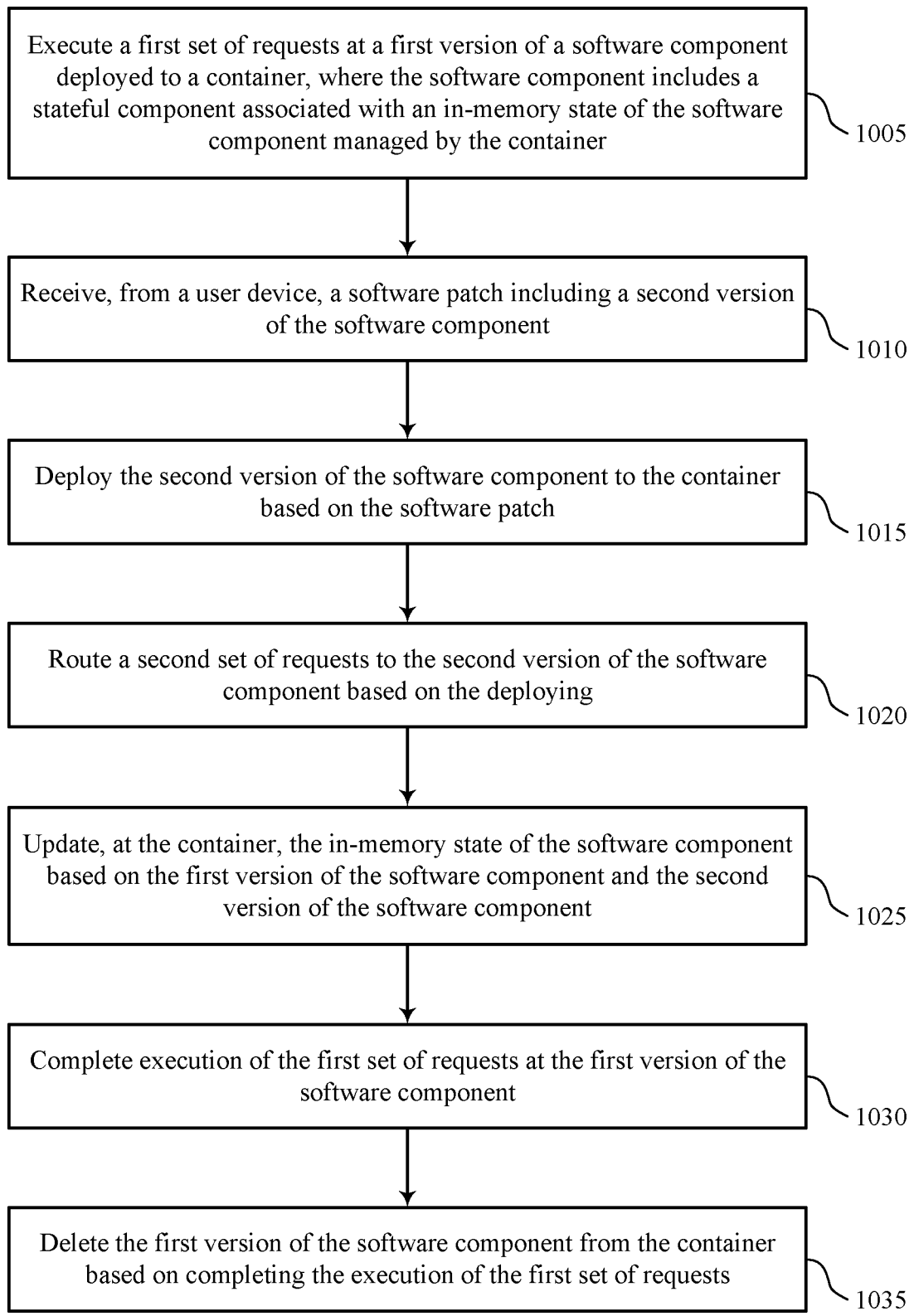

FIG. 10 shows a flowchart illustrating a method 1000 that supports live updates of stateful components in accordance with aspects of the present disclosure. The operations of method 1000 may be implemented by a server or its components as described herein. For example, the operations of method 1000 may be performed by a patching manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1005, the server may execute a first set of requests at a first version of a software component deployed to a container, where the software component includes a stateful component associated with an in-memory state of the software component managed by the container. The operations of 1005 may be performed according to the methods described herein. In some examples, aspects of the operations of 1005 may be performed by a request manager as described with reference to FIGS. 6 through 8.

At 1010, the server may receive, from a user device, a software patch including a second version of the software component. The operations of 1010 may be performed according to the methods described herein. In some examples, aspects of the operations of 1010 may be performed by a component manager as described with reference to FIGS. 6 through 8.

At 1015, the server may deploy the second version of the software component to the container based on the software patch. The operations of 1015 may be performed according to the methods described herein. In some examples, aspects of the operations of 1015 may be performed by a component manager as described with reference to FIGS. 6 through 8.

At 1020, the server may route a second set of requests to the second version of the software component based on the deploying. The operations of 1020 may be performed according to the methods described herein. In some examples, aspects of the operations of 1020 may be performed by a routing component as described with reference to FIGS. 6 through 8.

At 1025, the server may update, at the container, the in-memory state of the software component based on the first version of the software component and the second version of the software component. The operations of 1025 may be performed according to the methods described herein. In some examples, aspects of the operations of 1025 may be performed by a state manager as described with reference to FIGS. 6 through 8.

At 1030, the server may complete execution of the first set of requests at the first version of the software component. The operations of 1030 may be performed according to the methods described herein. In some examples, aspects of the operations of 1030 may be performed by a request manager as described with reference to FIGS. 6 through 8.

At 1035, the server may delete the first version of the software component from the container based on completing the execution of the first set of requests. The operations of 1035 may be performed according to the methods described herein. In some examples, aspects of the operations of 1035 may be performed by a component manager as described with reference to FIGS. 6 through 8.

A method for managing software updates is described. The method may include executing a first set of requests at a first version of a software component deployed to a container, where the software component includes a stateful component associated with an in-memory state of the software component managed by the container, receiving, from a user device, a software patch including a second version of the software component, deploying the second version of the software component to the container based on the software patch, routing a second set of requests to the second version of the software component based on the deploying, and updating, at the container, the in-memory state of the software component based on the first version of the software component and the second version of the software component.

An apparatus for managing software updates is described. The apparatus may include a processor, memory coupled with the processor, and instructions stored in the memory. The instructions may be executable by the processor to cause the apparatus to execute a first set of requests at a first version of a software component deployed to a container, where the software component includes a stateful component associated with an in-memory state of the software component managed by the container, receive, from a user device, a software patch including a second version of the software component, deploy the second version of the software component to the container based on the software patch, route a second set of requests to the second version of the software component based on the deploying, and update, at the container, the in-memory state of the software component based on the first version of the software component and the second version of the software component.

Another apparatus for managing software updates is described. The apparatus may include means for executing a first set of requests at a first version of a software component deployed to a container, where the software component includes a stateful component associated with an in-memory state of the software component managed by the container, receiving, from a user device, a software patch including a second version of the software component, deploying the second version of the software component to the container based on the software patch, routing a second set of requests to the second version of the software component based on the deploying, and updating, at the container, the in-memory state of the software component based on the first version of the software component and the second version of the software component.

A non-transitory computer-readable medium storing code for managing software updates is described. The code may include instructions executable by a processor to execute a first set of requests at a first version of a software component deployed to a container, where the software component includes a stateful component associated with an in-memory state of the software component managed by the container, receive, from a user device, a software patch including a second version of the software component, deploy the second version of the software component to the container based on the software patch, route a second set of requests to the second version of the software component based on the deploying, and update, at the container, the in-memory state of the software component based on the first version of the software component and the second version of the software component.

Some examples of the method, apparatuses, and non-transitory computer-readable medium described herein may further include operations, features, means, or instructions for completing execution of the first set of requests at the first version of the software component and deleting the first version of the software component from the container based on completing the execution of the first set of requests.

Some examples of the method, apparatuses, and non-transitory computer-readable medium described herein may further include operations, features, means, or instructions for executing the second set of requests at the second version of the software component based on the routing.

In some examples of the method, apparatuses, and non-transitory computer-readable medium described herein, the software component may be associated with a software application. Some such examples of the method, apparatuses, and non-transitory computer-readable medium described herein may further include operations, features, means, or instructions for running the software application, where executing the first set of requests at the first version of the software component and executing the second set of requests at the second version of the software component may be based on running the software application.

Some examples of the method, apparatuses, and non-transitory computer-readable medium described herein may further include operations, features, means, or instructions for performing a patching operation based on receiving the software patch, where the patching operation includes deploying the second version of the software component to the container and deleting the first version of the software component from the container, and maintaining a connection for running the software application, a data flow for running the software application, or both throughout the patching operation.

Some examples of the method, apparatuses, and non-transitory computer-readable medium described herein may further include operations, features, means, or instructions for communicating with a set of user devices operated by a set of users based on running the software application, where the patching operation may be performed transparent to the set of users.

In some examples of the method, apparatuses, and non-transitory computer-readable medium described herein, at least a portion of the first set of requests may be executed at the first version of the software component concurrent to at least a portion of the second set of requests being executed at the second version of the software component.

In some examples of the method, apparatuses, and non-transitory computer-readable medium described herein, deploying the second version of the software component may include operations, features, means, or instructions for replicating the in-memory state of the software component from the first version of the software component to the second version of the software component.

In some examples of the method, apparatuses, and non-transitory computer-readable medium described herein, updating the in-memory state of the software component further may include operations, features, means, or instructions for implementing a protocol to manage the in-memory state of the software component.

In some examples of the method, apparatuses, and non-transitory computer-readable medium described herein, updating the in-memory state of the software component further may include operations, features, means, or instructions for receiving, at the container, first execution information for the first version of the software component and second execution information for the second version of the software component, aggregating the first execution information and the second execution information according to the protocol, and updating the in-memory state of the software component based on the aggregating.

Some examples of the method, apparatuses, and non-transitory computer-readable medium described herein may further include operations, features, means, or instructions for managing, at the container, a set of resources for the software component, the set of resources including the in-memory state of the software component.

In some examples of the method, apparatuses, and non-transitory computer-readable medium described herein, the first version of the software component and the second version of the software component access the set of resources from the container to execute the first set of requests and the second set of requests.

Some examples of the method, apparatuses, and non-transitory computer-readable medium described herein may further include operations, features, means, or instructions for intercepting, at a mediator associated with a set of software components, a request indicating the software component and routing the request to the container including the software component based on the request indicating the software component.

Some examples of the method, apparatuses, and non-transitory computer-readable medium described herein may further include operations, features, means, or instructions for maintaining, at the mediator, a set of connections with the set of software components via a set of APIs.

In some examples of the method, apparatuses, and non-transitory computer-readable medium described herein, the second set of requests may be routed to the second version of the software component via an API.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one" of or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing software updates, comprising:
   executing a first set of requests at a first version of a software component deployed to a container, wherein the software component comprises a stateful component, and wherein executing the first set of requests changes an in-memory state of the software component managed by the container based at least in part on the software component comprising the stateful component;
   receiving, from a user device, a software patch comprising a second version of the software component;
   deploying the second version of the software component to the container based at least in part on the software patch and concurrent with executing at least a first portion of the first set of requests at the first version of the software component;
   routing a second set of requests to the second version of the software component based at least in part on the deploying; and
   updating, at the container, the in-memory state of the software component based at least in part on the first version of the software component and the second version of the software component.

2. The method of claim 1, further comprising:
   completing execution of the first set of requests at the first version of the software component; and
   deleting the first version of the software component from the container based at least in part on completing the execution of the first set of requests.

3. The method of claim 1, further comprising:
   executing the second set of requests at the second version of the software component based at least in part on the routing.

4. The method of claim 3, wherein the software component is associated with a software application, the method further comprising:
   running the software application, wherein executing the first set of requests at the first version of the software component and executing the second set of requests at the second version of the software component are based at least in part on running the software application.

5. The method of claim 4, further comprising:
   performing a patching operation based at least in part on receiving the software patch, wherein the patching operation comprises deploying the second version of the software component to the container and deleting the first version of the software component from the container; and maintaining a connection for running the software application, a data flow for running the software application, or both throughout the patching operation.

6. The method of claim 5, further comprising:
communicating with a plurality of user devices operated by a plurality of users based at least in part on running the software application, wherein the patching operation is performed transparent to the plurality of users.

7. The method of claim 3, wherein at least a second portion of the first set of requests is executed at the first version of the software component concurrent to at least a portion of the second set of requests being executed at the second version of the software component.

8. The method of claim 1, wherein deploying the second version of the software component comprises:
replicating the in-memory state of the software component from the first version of the software component to the second version of the software component.

9. The method of claim 1, wherein updating the in-memory state of the software component further comprises:
implementing a protocol to manage the in-memory state of the software component.

10. The method of claim 9, wherein updating the in-memory state of the software component further comprises:
receiving, at the container, first execution information for the first version of the software component and second execution information for the second version of the software component;
aggregating the first execution information and the second execution information according to the protocol; and
updating the in-memory state of the software component based at least in part on the aggregating.

11. The method of claim 1, further comprising:
managing, at the container, a set of resources for the software component, the set of resources comprising the in-memory state of the software component.

12. The method of claim 11, wherein the first version of the software component and the second version of the software component access the set of resources from the container to execute the first set of requests and the second set of requests.

13. The method of claim 1, further comprising:
intercepting, at a mediator associated with a plurality of software components, a request indicating the software component; and
routing the request to the container comprising the software component based at least in part on the request indicating the software component.

14. The method of claim 13, further comprising:
maintaining, at the mediator, a plurality of connections with the plurality of software components via a plurality of application programming interfaces.

15. The method of claim 1, wherein the second set of requests is routed to the second version of the software component via an application programming interface.

16. An apparatus for managing software updates, comprising:
a processor;
memory coupled with the processor; and
instructions stored in the memory and executable by the processor to cause the apparatus to:
execute a first set of requests at a first version of a software component deployed to a container, wherein the software component comprises a stateful component, and wherein executing the first set of requests changes an in-memory state of the software component managed by the container based at least in part on the software component comprising the stateful component;
receive, from a user device, a software patch comprising a second version of the software component;
deploy the second version of the software component to the container based at least in part on the software patch and concurrent with executing at least a first portion of the first set of requests at the first version of the software component;
route a second set of requests to the second version of the software component based at least in part on the deploying; and
update, at the container, the in-memory state of the software component based at least in part on the first version of the software component and the second version of the software component.

17. The apparatus of claim 16, wherein the instructions are further executable by the processor to cause the apparatus to:
complete execution of the first set of requests at the first version of the software component; and
delete the first version of the software component from the container based at least in part on completing the execution of the first set of requests.

18. A non-transitory computer-readable medium storing code for managing software updates, the code comprising instructions executable by a processor to:
execute a first set of requests at a first version of a software component deployed to a container, wherein the software component comprises a stateful component, and wherein executing the first set of requests changes in-memory state of the software component managed by the container based at least in part on the software component comprising the stateful component;
receive, from a user device, a software patch comprising a second version of the software component;
deploy the second version of the software component to the container based at least in part on the software patch and concurrent with executing at least a first portion of the first set of requests at the first version of the software component;
route a second set of requests to the second version of the software component based at least in part on the deploying; and
update, at the container, the in-memory state of the software component based at least in part on the first version of the software component and the second version of the software component.

19. The non-transitory computer-readable medium of claim 18, wherein the instructions are further executable to:
complete execution of the first set of requests at the first version of the software component; and
delete the first version of the software component from the container based at least in part on completing the execution of the first set of requests.

20. The non-transitory computer-readable medium of claim 18, wherein the instructions are further executable to:
execute the second set of requests at the second version of the software component based at least in part on the routing.

* * * * *